US012643483B2

(12) United States Patent
Hong et al.

(10) Patent No.: US 12,643,483 B2
(45) Date of Patent: Jun. 2, 2026

(54) VEHICLE SEAT APPARATUS FOR CHARGING PORTABLE ELECTRONIC DEVICE

(71) Applicants: Hyundai Motor Company, Seoul (KR); Kia Corporation, Seoul (KR)

(72) Inventors: Suk Won Hong, Bucheon (KR); Hyeong Jong Kim, Seoul (KR); Ju Yeol Kong, Ansan (KR); Byeong Kwang Kim, Suwon (KR); Seong Hyeon Shin, Suwon (KR); Han Su Yoo, Hwaseong (KR); Byung Yong Choi, Hwaseong (KR); Sang Do Park, Seoul (KR); So Young Yoo, Suwon (KR); Jeong Mi Seo, Seongnam (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 164 days.

(21) Appl. No.: 18/608,116

(22) Filed: Mar. 18, 2024

(65) Prior Publication Data

US 2025/0033568 A1     Jan. 30, 2025

(30) Foreign Application Priority Data

Jul. 27, 2023     (KR) ........................ 10-2023-0098200

(51) Int. Cl.
B60R 7/04          (2006.01)
B60N 2/64          (2006.01)
(Continued)

(52) U.S. Cl.
CPC .............. B60R 7/043 (2013.01); B60N 2/643 (2013.01); B60N 2/90 (2018.02); B60R 2011/0015 (2013.01); B60R 2011/0075 (2013.01)

(58) Field of Classification Search
CPC ..... B60R 7/043; B60R 11/02; B60R 11/0241; B60R 11/0252; B60R 2011/0015; (Continued)

(56) References Cited

U.S. PATENT DOCUMENTS 11,027,670 B1     6/2021   Tait
2021/0178990 A1*  6/2021   Yoo ...................... B60N 2/0244

FOREIGN PATENT DOCUMENTS

KR     10-2016-0001328 A     1/2016
KR         10-1618570 B1     5/2016
(Continued)

*Primary Examiner* — Ashesh Dangol
(74) *Attorney, Agent, or Firm* — Fox Rothschild LLP

(57)          ABSTRACT
A vehicle seat apparatus includes: a receiving device provided on a seat of a vehicle, where an auxiliary battery and a portable electronic device are received in the receiving device, and a controller that controls power transmission between the auxiliary battery received in the receiving device and a convenience device of the seat. The receiving device is provided on a back board of the seat, and the auxiliary battery and the portable electronic device may be received in the receiving device or taken from the receiving device. During charging, the auxiliary battery is charged with power of a vehicle power supply or the portable electronic device is wirelessly charged with power of the auxiliary battery in normal times, and the power of the auxiliary battery may be supplied to the convenience device of the seat in an emergency.

19 Claims, 15 Drawing Sheets

(51) Int. Cl.
　　*B60N 2/90* 　　　　(2018.01)
　　*B60R 11/00* 　　　(2006.01)
(58) Field of Classification Search
　　CPC ..... B60R 2011/0276; B60N 2/90; B60N 3/00;
　　　　　　　　　　B60N 3/001; B60N 3/102
　　See application file for complete search history.

(56) 　　　　　　　References Cited

FOREIGN PATENT DOCUMENTS

KR 　　　20180039354 A 　* 　4/2018 　........... H02J 7/0042
KR 　　　10-2408503 B1 　　6/2022

* cited by examiner

VEHICLE SEAT APPARATUS FOR CHARGING PORTABLE ELECTRONIC DEVICE

CROSS-REFERENCE TO RELATED APPLICATION

This application claims under 35 U.S.C. § 119 (a) the benefit of Korean Patent Application No. 10-2023-0098200, filed on Jul. 27, 2023 in the Korean Intellectual Property Office, the entire contents of which are incorporated herein by reference.

BACKGROUND

1. Technical Field

The present disclosure relates to a vehicle seat apparatus, more particularly, to the vehicle seat apparatus that is configured to wirelessly charge a portable electronic device.

2. Description of the Related Art

Smart electronic products are being used by consumers at an increasing rate due to the advancement of technology, and as a result, portable electronic devices (smart phones, tablet computers, etc.) have become necessities in our daily lives.

In a vehicle, a portable electronic device typically is charged using a USB port or through a wireless charging method.

When the USB port is used, a separate charging cable needs to be provided and thus causes inconvenience, and in the case of the wireless charging method, a wireless charging module is conventionally provided only around the driver's seat of the vehicle, and thus, a passenger in a rear seat is not capable of effectively using wireless charging.

The above information disclosed in the Background section is only for enhancement of understanding of the background of the disclosure and should not be interpreted as conventional technology that is already known to those skilled in the art.

SUMMARY

Therefore, the present disclosure provides a vehicle seat apparatus which forms a space for holding an auxiliary battery and a portable electronic device on a seat of a vehicle, and is configured to perform charging of the auxiliary battery by a vehicle power supply and wireless charging of the portable electronic device by the auxiliary battery in ordinary times, so as to expand the range of passengers utilizing wireless charging in vehicles.

It is an object of the present disclosure to provide a vehicle seat apparatus which enables a seat to function normally by supplying power of a charged auxiliary battery to the seat in a situation in which power of a vehicle power supply is not supplied to the seat, so as to reduce loss of life in the event of an accident.

In accordance with the present disclosure, the above and other objects can be accomplished by the provision of a vehicle seat apparatus including a receiving device provided on a seat of a vehicle, and configured such that an auxiliary battery and a portable electronic device are received therein, and a controller configured to control power transmission between the auxiliary battery received in the receiving device and a convenience device of the seat.

The portable electronic device received in the receiving device may be wirelessly charged by the auxiliary battery.

The receiving device may include a rotary plate rotatably coupled to a back board of the seat, projections provided on one surface of the rotary plate to fix the received auxiliary battery, and a mesh net provided on a remaining surface of the rotary plate to restrain the received portable electronic device.

A receiving recess dented in a concave shape may be formed on the back board, and the auxiliary battery fixed by the projections may be inserted into the receiving recess so as to be received therein.

A receiving recess configured such that the auxiliary battery is inserted thereinto so as to be received therein may be formed on the back board, and the rotary plate may open and close the receiving recess by rotating an upper end of the rotary plate about hinge shafts provided at a lower end of the rotary plate and coupled to the back board.

The portable electronic device received in the mesh net may be exposed rearwards and may be within a line of sight of a passenger seated in a back seat (i.e., rear seat) of the vehicle.

A connection terminal electrically connected to the auxiliary battery restrained by the projections may be provided on the rotary plate, and the connection terminal may be electrically connected to a vehicle power supply and the convenience device of the seat through the controller.

The controller may transmit power, supplied from the vehicle power supply to the convenience device of the seat, to the auxiliary battery received in the receiving device so as to charge the auxiliary battery.

The controller may discharge power of the auxiliary battery so as to supply the power of the auxiliary battery to the convenience device of the seat, when power supply from the vehicle power supply to the convenience device of the seat is cut off.

The controller may transmit power, supplied to the convenience device of the seat, to the auxiliary battery received in the receiving device so as to charge the auxiliary battery, when an amount of current supplied from the vehicle power supply to the convenience device of the seat is equal to or greater than a predetermined amount.

The controller may discharge power of the auxiliary battery so as to supply the power of the auxiliary battery to the convenience device of the seat, when an amount of current supplied from the vehicle power supply to the convenience device of the seat is less than a predetermined amount.

The receiving device may further include a locking device configured to maintain a closed state of the receiving recess by the rotary plate, and open springs installed on the hinge shafts of the rotary plate, and configured to have one end supported by the back board and a remaining end supported by the rotary plate and to provide elastic force to the rotary plate so as to rotate the rotary plate in a direction of opening the receiving recess when the locking device is unlocked.

The locking device may include a locking button provided on the rotary plate and operated by pressing, a locking hook connected to the locking button through links and configured to maintain a locked state between the locking hook and a locking protrusion provided on the rotary plate, when the locking hook comes into contact with the locking protrusion, and locking springs installed on a lower end hinge pin configured to connect the links to the locking hook, and configured to have one end supported by the back board and a remaining end supported by the locking hook and to provide elastic force to the locking hook so as to maintain the locked state between the locking hook and the locking protrusion.

The locking device may include a locking lever provided on the back board and operated by upward and downward sliding, and, when an end of the locking lever overlaps the rotary plate, a locked state of the rotary plate by the locking lever may be maintained in a state in which the rotary plate closes the receiving recess.

When the vehicle is charged using an external charging device in a state in which the auxiliary battery is received in the receiving device, the auxiliary battery may be charged together with the vehicle, and power of the charged auxiliary battery may be used as a vehicle power source.

The controller may be configured to be provided separately from the auxiliary battery so as to control input and output modes of the auxiliary battery, or the auxiliary battery may be configured to recognize the input and output modes so as to control input and output.

A vehicle seat may incorporate the vehicle seat apparatus.

A vehicle may incorporate the vehicle seat apparatus.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
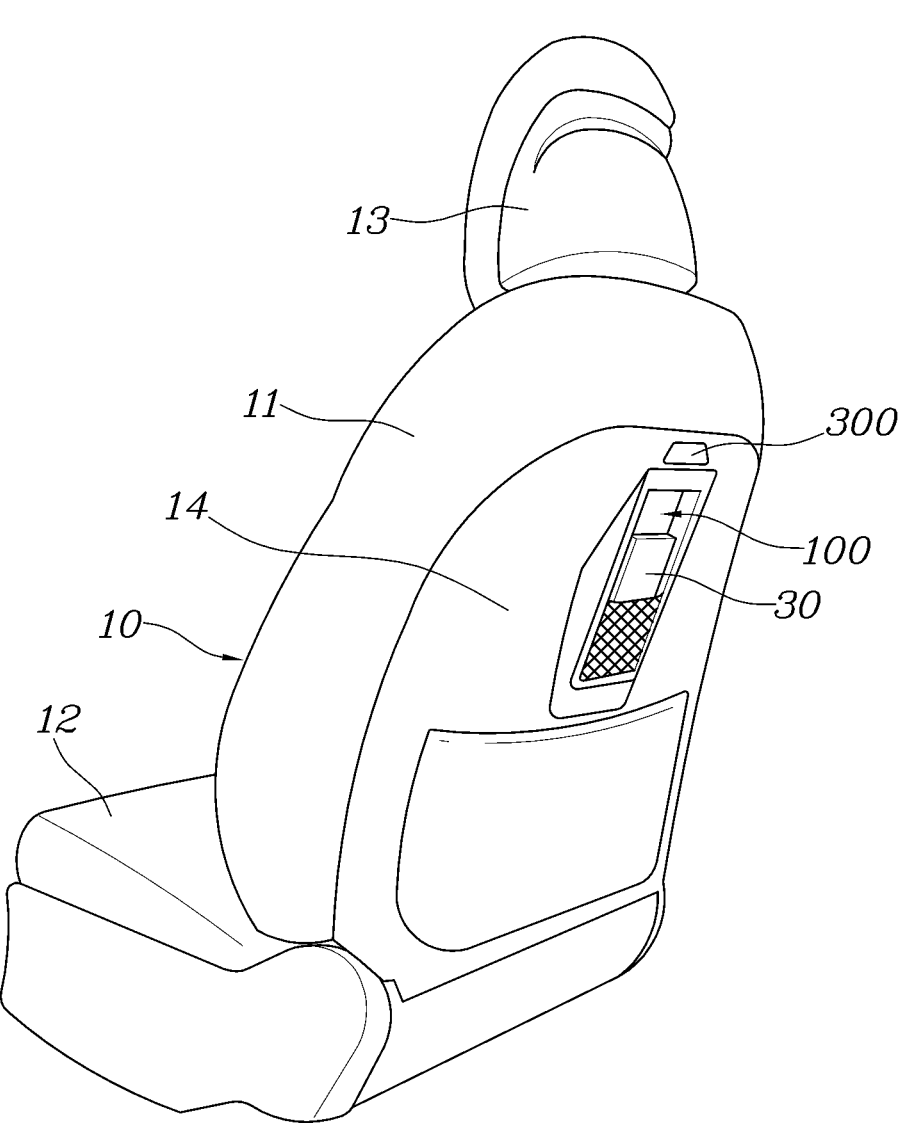
FIG. 1 is a perspective view showing a back board of a seat, on which a receiving device is provided, according to the present disclosure.
Figure 2:
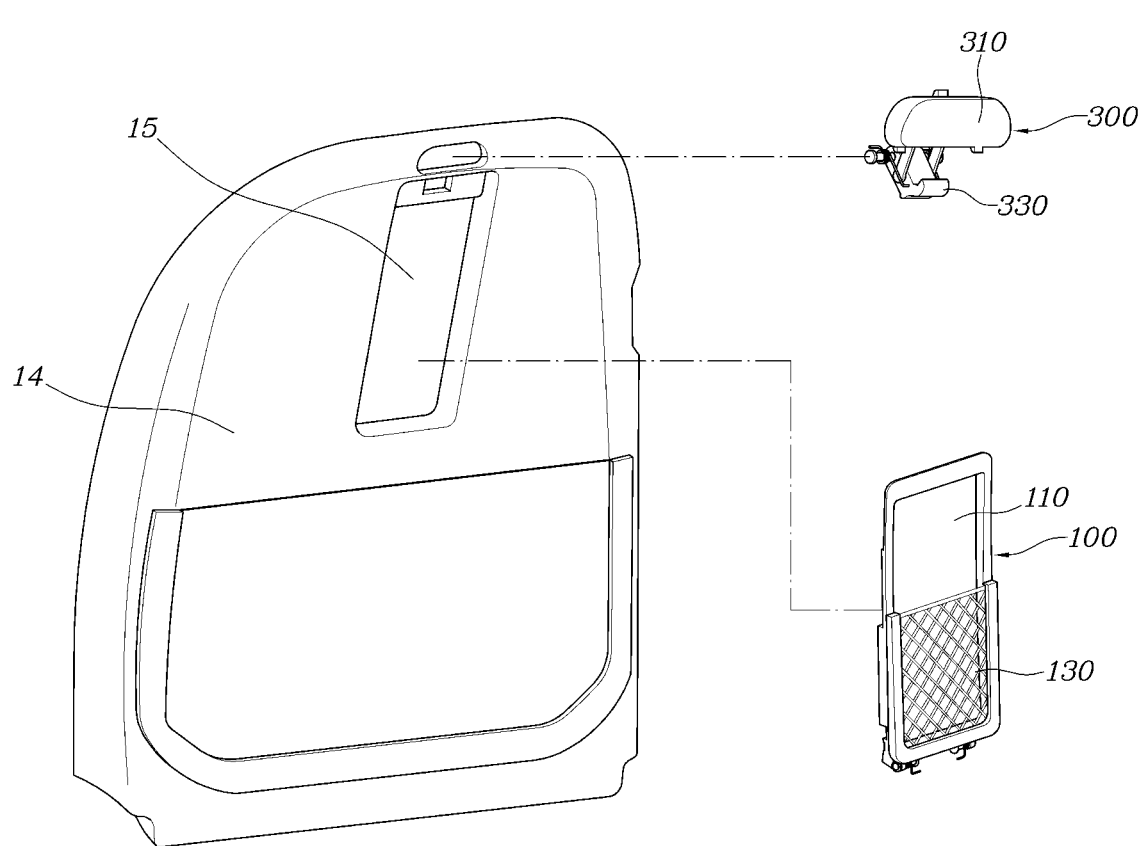
FIG. 2 is an exploded perspective view showing the back board, the receiving device, and a locking device according to the present disclosure.
Figure 3:
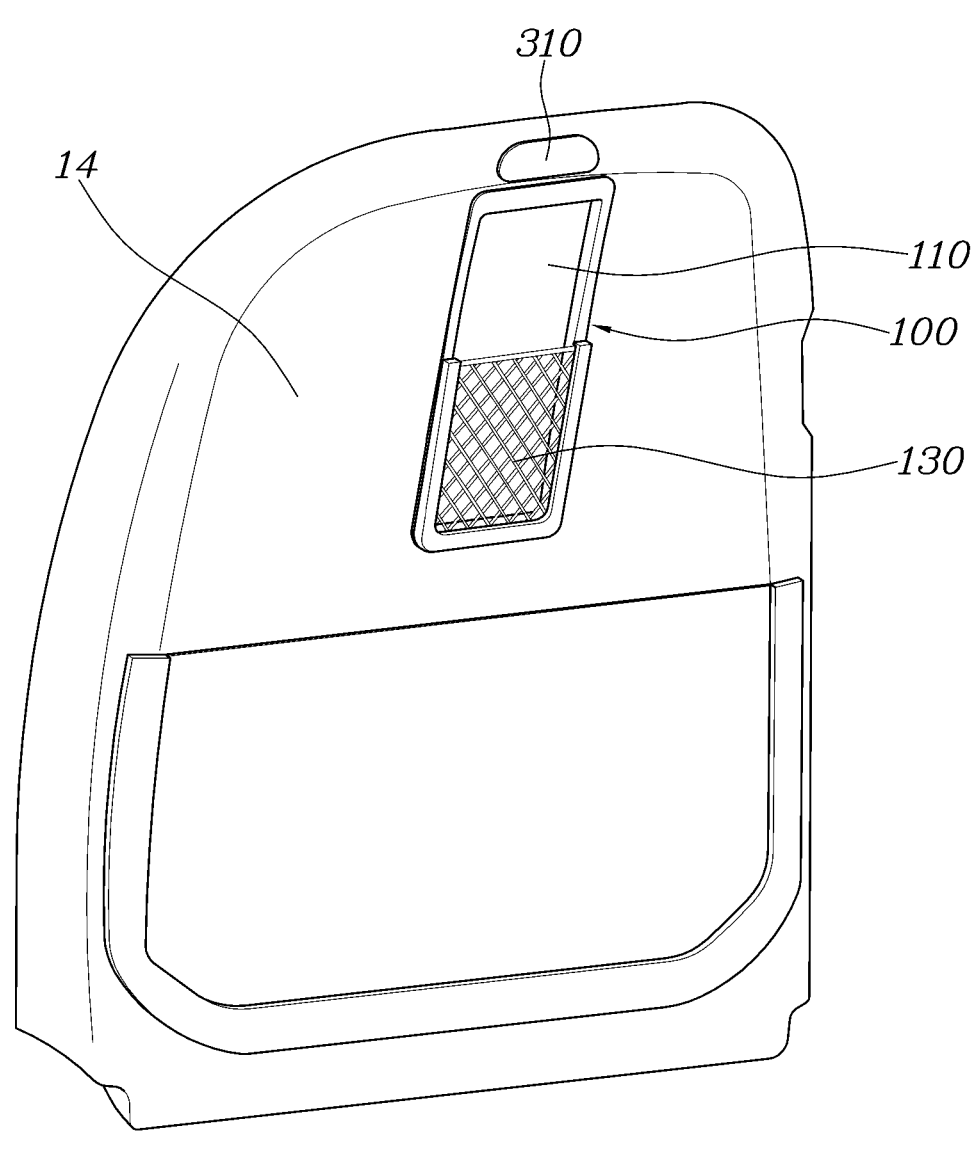
FIG. 3 is a perspective view showing an assembled state of the elements shown in FIG. 2.
Figure 4:
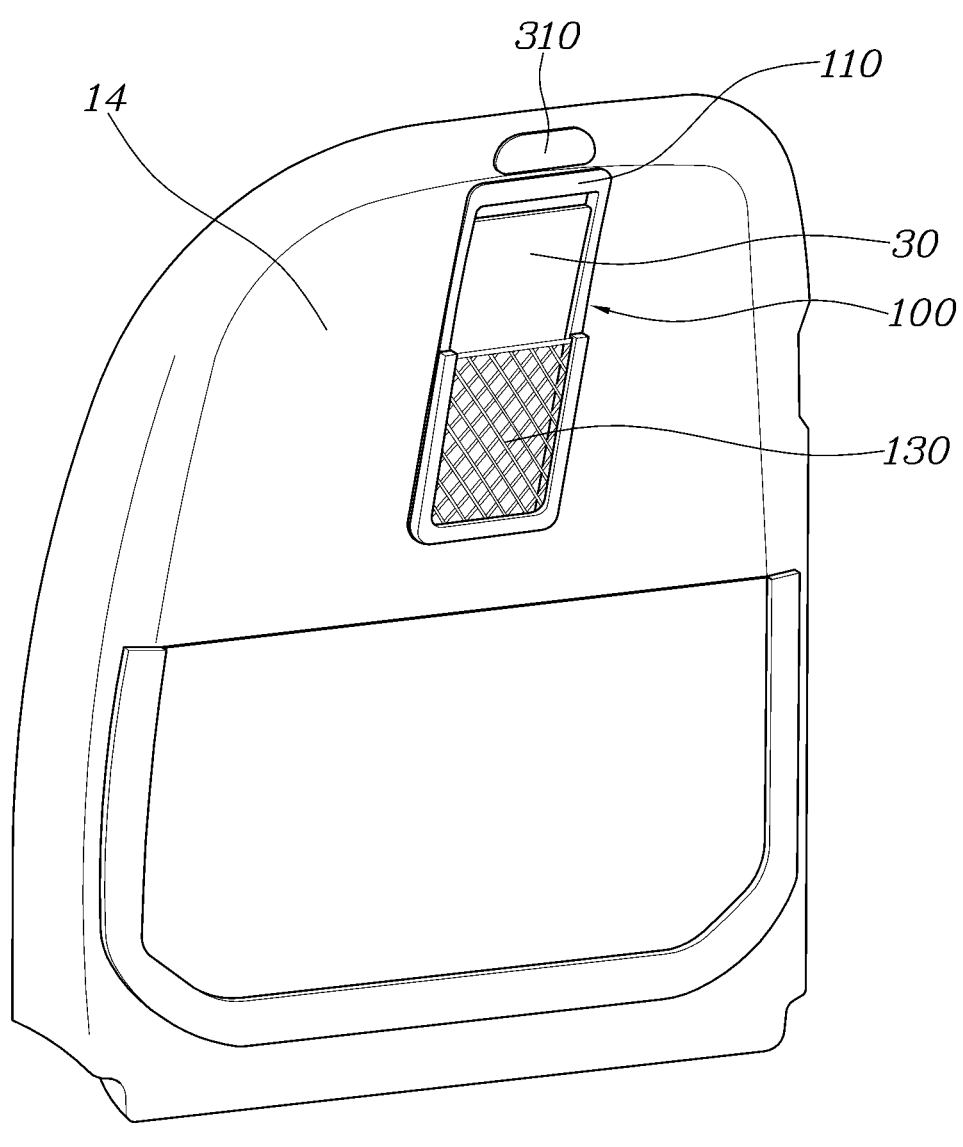
FIG. 4 is a perspective view showing a state in which a portable electronic device is received in a mesh net in the state of FIG. 3.
Figure 5:
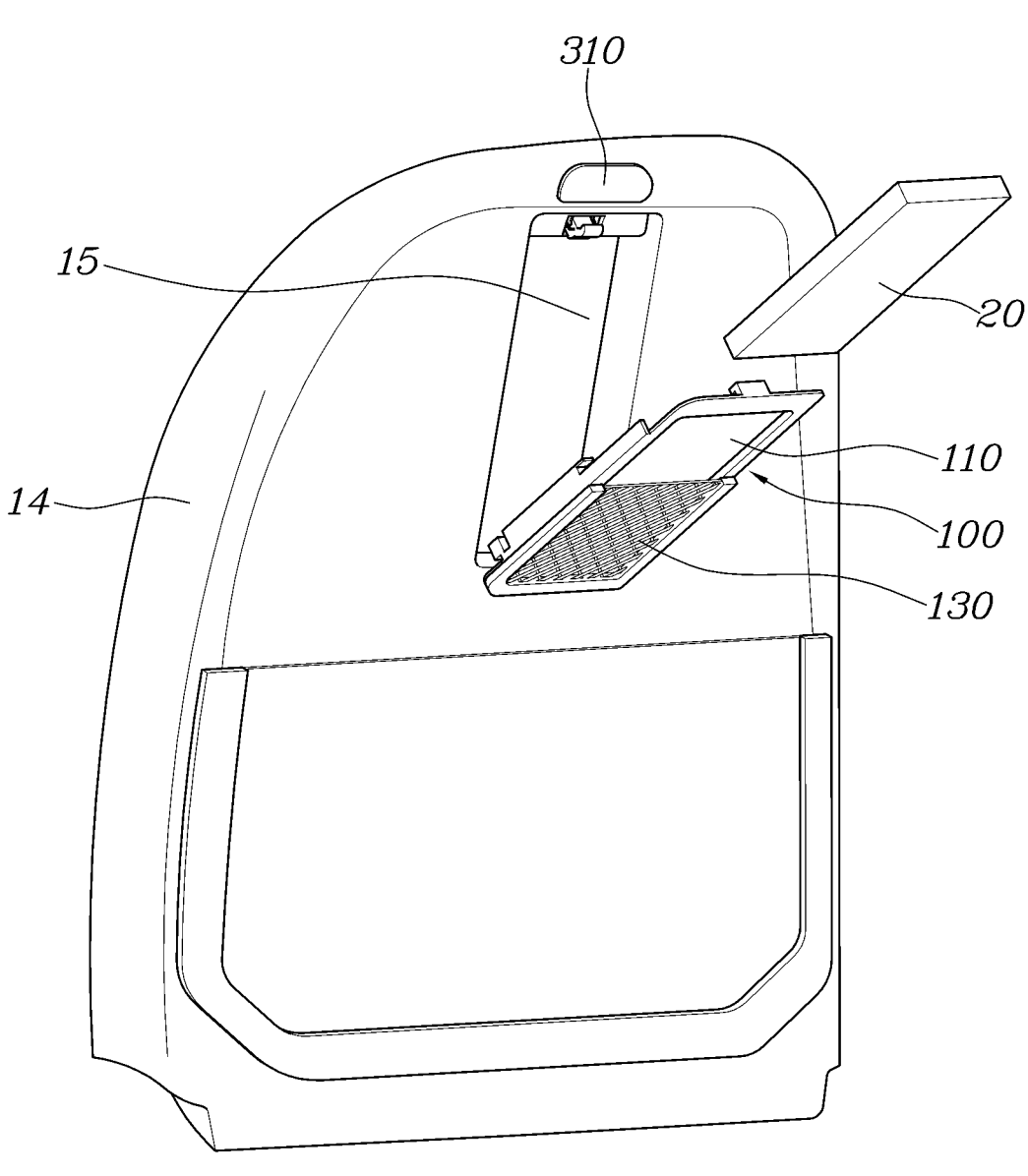
FIG. 5 is a perspective view showing a state in which a rotary plate is rotated to open a receiving recess of the back board.
Figure 6:
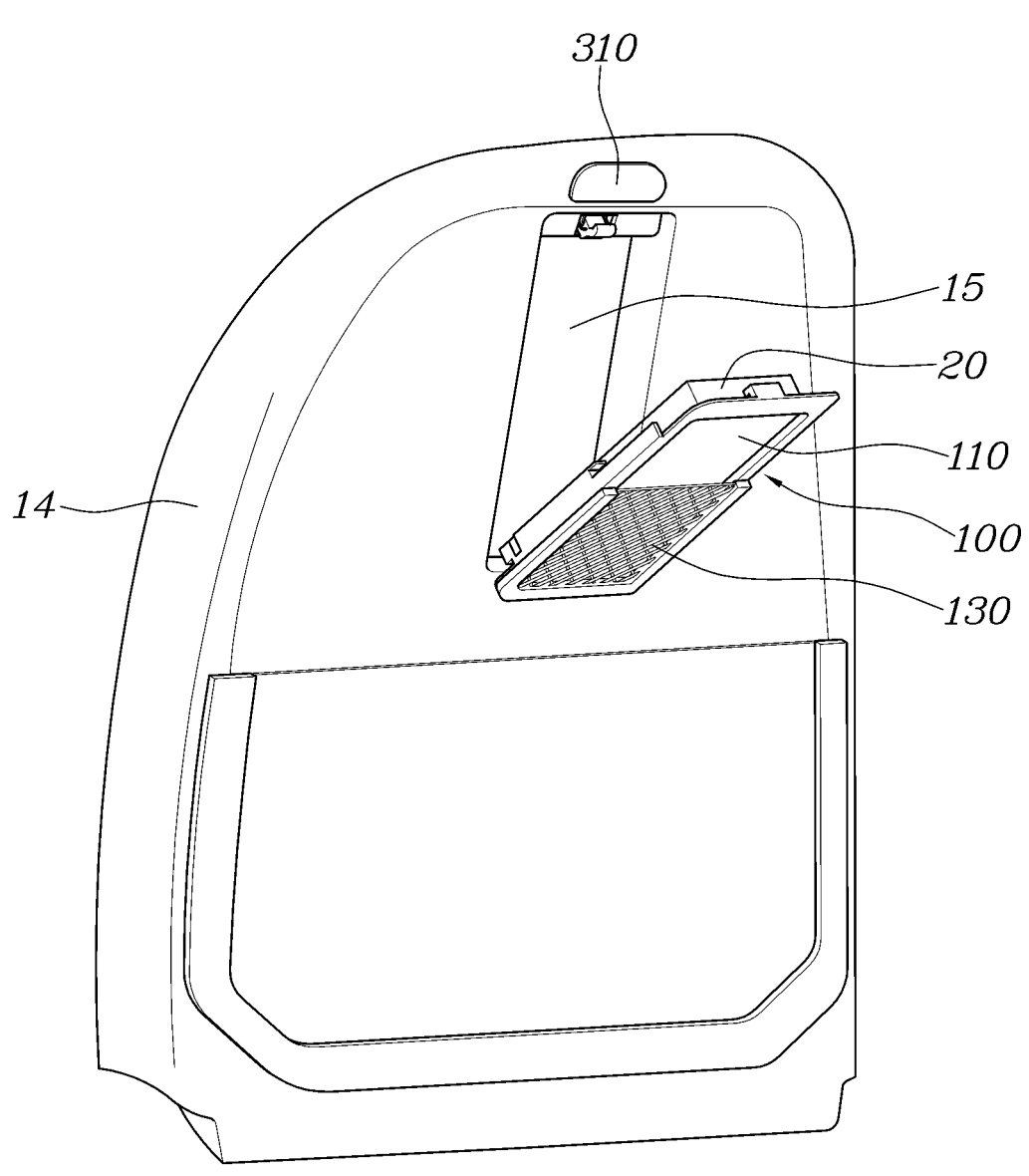
FIG. 6 is a perspective view showing a state in which an auxiliary battery is received on the front surface of the rotary plate in the state of FIG. 5.
Figure 7:
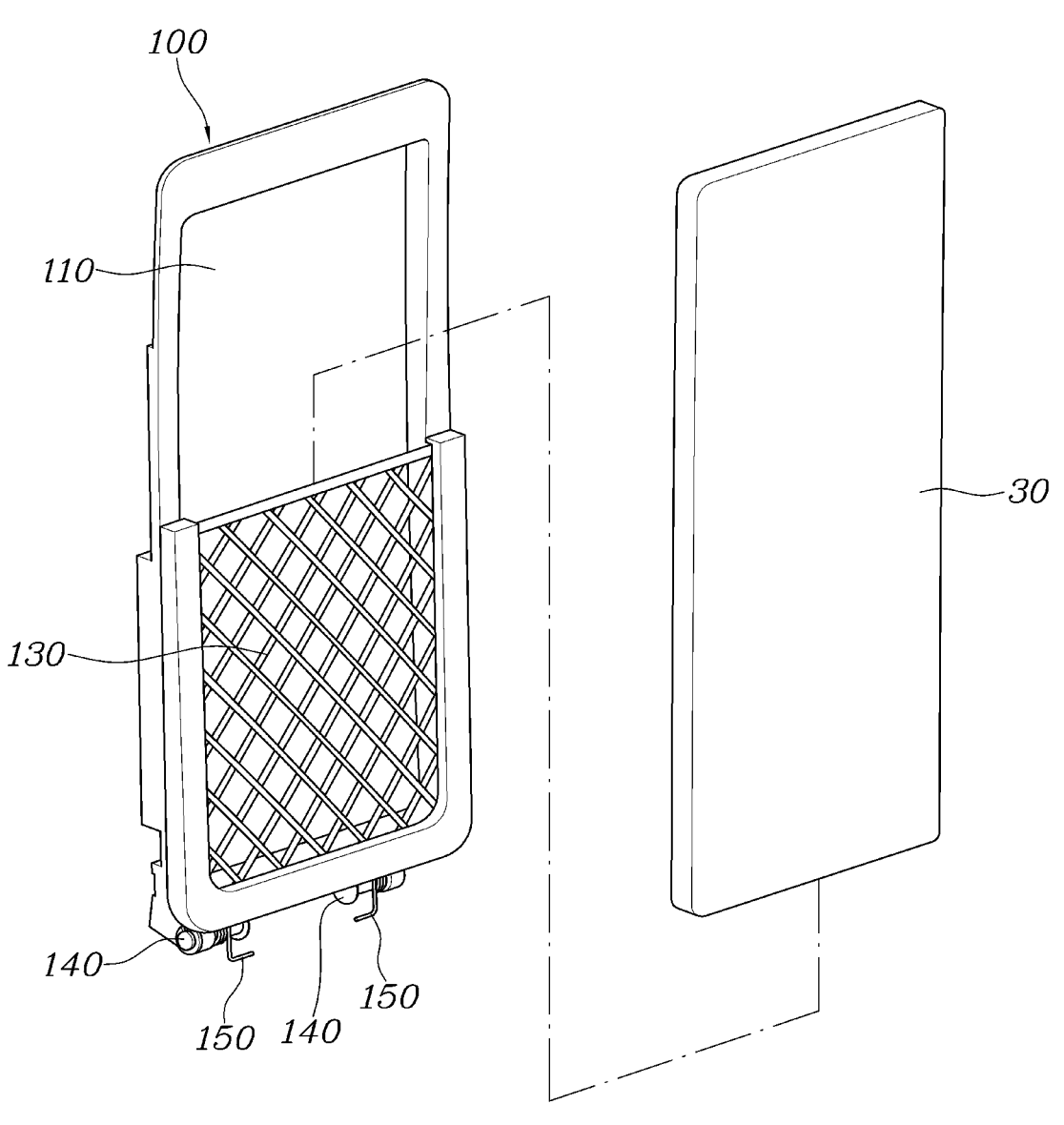
FIG. 7 is a perspective view showing a state in which the portable electronic device is withdrawn out of the mesh net.
Figure 8:
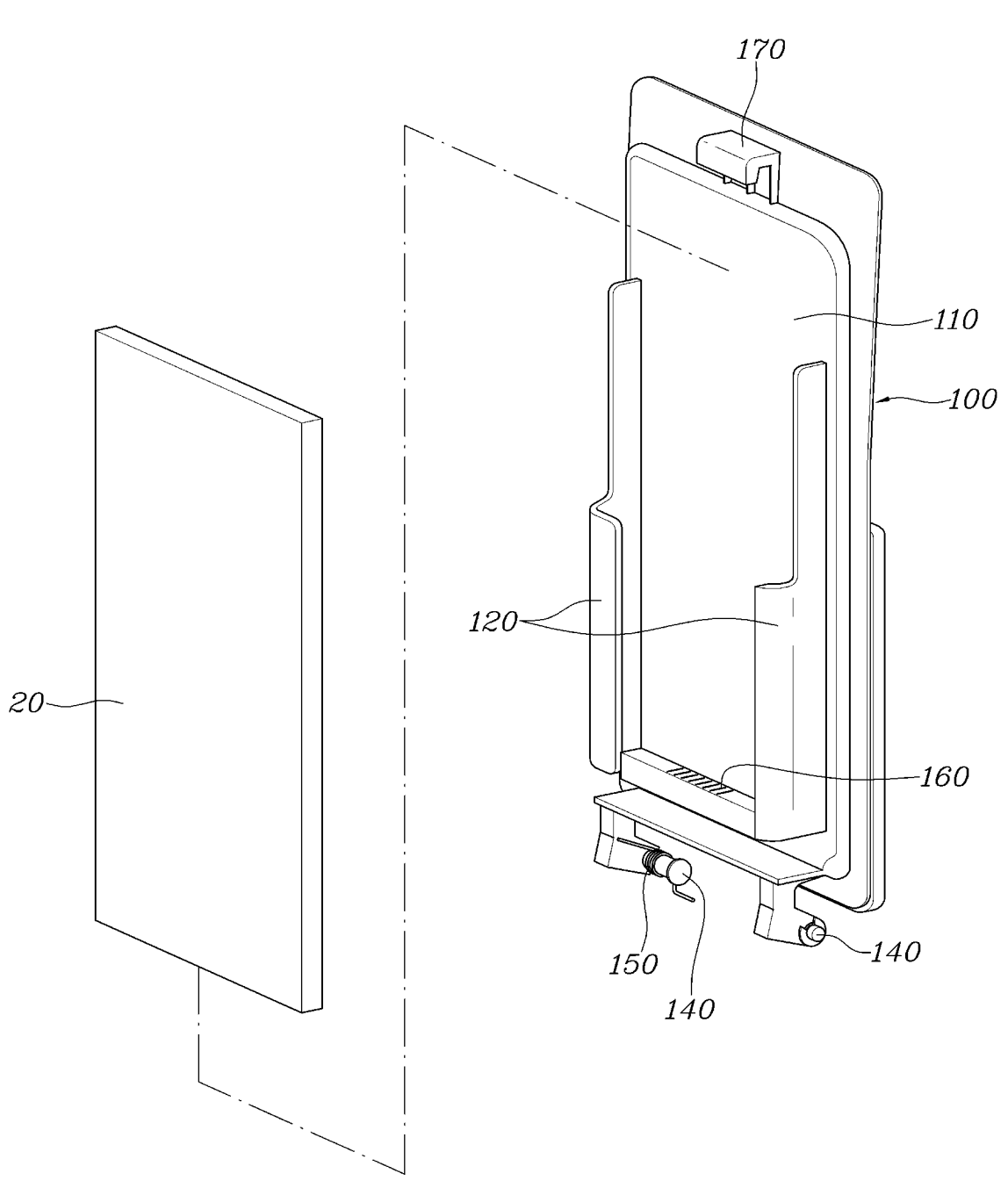
FIG. 8 is a perspective view showing a state in which the auxiliary battery is withdrawn from projections.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", "portion" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein.

The embodiments of the present disclosure may be variously modified and changed, and thus specific embodiments of the present disclosure will be illustrated in the drawings and described in detail in the following description of the embodiments of the present disclosure. However, it will be understood that the embodiments of the present disclosure are provided only to completely disclose the disclosure and cover modifications, equivalents or alternatives which come within the scope and technical range of the disclosure.

In the following description of the embodiments, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

When an element or layer is referred to as being "connected to" or "coupled to" another element or layer, it may be directly connected or coupled to the other element or layer, or intervening elements or layers may be present. In contrast, when an element or layer is referred to as being "directly connected to" or "directly coupled to" another element or layer, there may be no intervening elements or layers present. Other words used to describe relationships between elements should be interpreted in a like fashion, e.g., "between" versus "directly between," "adjacent" versus "directly adjacent," etc.

Unless defined otherwise, all terms including technical and scientific terms used in the following description have the same meanings as those of terms generally understood by those skilled in the art. Terms defined in generally used dictionaries will be interpreted as having meanings coinciding with contextual meanings in the related technology, and are not to be interpreted as having ideal or excessively formal meanings unless defined clearly in the description.

A control unit (a controller) according to the exemplary embodiment of the present disclosure may be implemented through a non-volatile memory (not shown) configured to store an algorithm configured to control operations of various elements of a vehicle or data regarding software commands for reproducing the algorithm and a processor (not shown) configured to perform operations which will be described below using data stored in the corresponding memory. Here, the memory and the processor may be implemented as individual chips. Alternatively, the memory and the processor may be implemented as a single integrated chip. The processor may be provided in the form of one or more processors.

Hereinafter, a vehicle seat apparatus according to an exemplary embodiment of the present disclosure will be described with reference to the accompanying drawings.

The vehicle seat apparatus according to the present disclosure has a configuration in which an auxiliary battery 20 and a portable electronic device 30 may be received and stored in a seat 10 of a vehicle, and the auxiliary battery 20 and the portable electronic device 30 received in the seat 10 may be separated from the seat when a user needs the same, as shown in FIGS. 1 to 14.

Further, the auxiliary battery 20 received in the seat 10 may be charged with power supplied from a vehicle power supply 50 in normal times, and the portable electronic device 30 received in the seat 10 may be wirelessly charged by the auxiliary battery 20.

In addition, in a situation in which power is not supplied from the vehicle power supply 50 to a convenience device 40 of the seat, power of the charged auxiliary battery 20 may be supplied to the convenience device 40 of the seat 10 so as to normally perform the functions of the seat 10.

The seat 10 of the vehicle may generally include a seat back 11 configured to support the upper body of a passenger, a seat cushion 12 configured to support the lower body of the passenger, and a headrest 13 configured to support the head of the passenger.

A back board 14 is coupled to the rear surface of the seat back 11, and a receiving device 100 according to the present disclosure is coupled to the back board 14.

That is, the vehicle seat apparatus according to the present disclosure includes the receiving device 100 provided on the seat 10 of the vehicle and configured to receive the auxiliary battery 20 and the portable electronic device 30, and a controller 200 configured to control power transmission between the auxiliary battery 20 received in the receiving device 100 and the convenience device 40 of the seat 10.

The auxiliary battery 20 received in the receiving device 100 may be charged with power supplied from the vehicle power supply 50 under control of the controller 200, or may discharge power to supply the power to the convenience device 40 of the seat 10 under control of the controller 200.

The portable electronic device 30 may include any one of all electronic devices which may be carried by users, such as a smartphone or a tablet computer.

The portable electronic device 30 received in the receiving device 100 according to the present disclosure is wirelessly charged by the auxiliary battery 20.

In general, wireless power transmission systems are divided into an inductive coupled wireless power transmission system, a resonant magnetic coupled wireless power transmission system, and an RF-based wireless power transmission system.

The inductive coupled wireless power transmission system employs technology using nonradiative characteristics and no resonator, and uses the principle of electromagnetic induction in which, when a power transmitter coil generates a magnetic field, electricity is induced at a receiver coil under the influence of the magnetic field.

Figure 9:
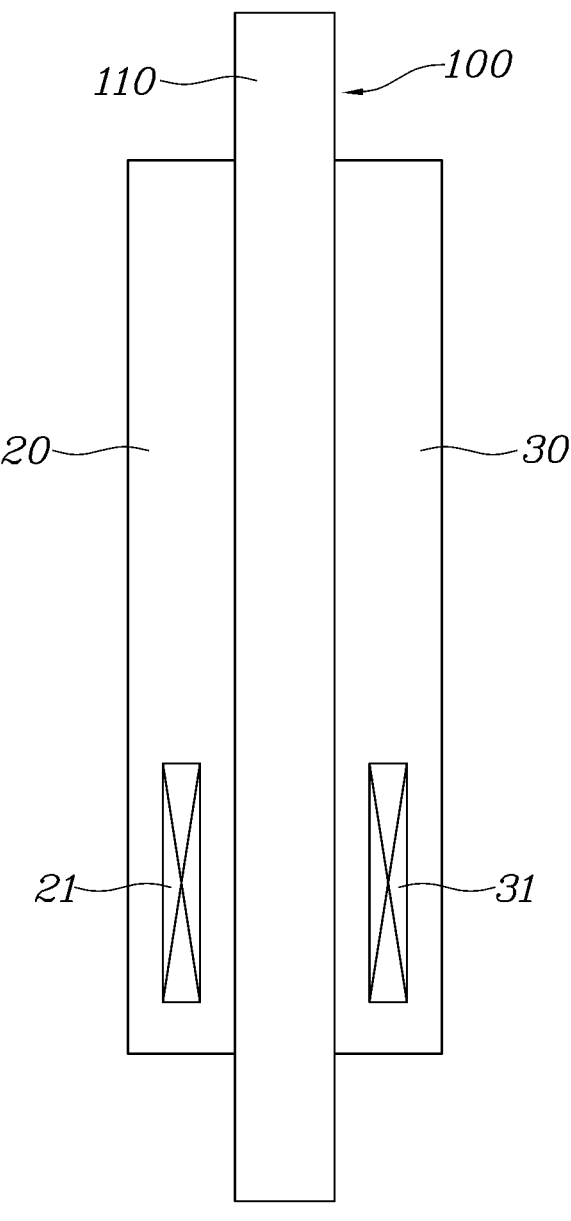
FIG. 9 is a view illustrating wireless charging of the portable electronic device according to the present disclosure.

Therefore, as shown in FIG. 9, a transmitter coil 21 is provided in the auxiliary battery 20, a receiver coil 31 is provided in the portable electronic device 30, the receiver coil 31 produces electricity due to the effect of a magnetic field generated by the transmitter coil 21, and the portable electronic device 30 received in the receiving device 100 is charged with the produced electricity.

The transmitter coil 21 and the receiver coil 31 form a wireless charging module.

The receiving device 100 according to the present disclosure includes a rotary plate 110 rotatably coupled to the back board 14 of the seat 10, projections 120 provided on one surface of the rotary plate 110 to fix the received auxiliary battery 20, and a mesh net 130 provided on the other surface of the rotary plate 110 to restrain the received portable electronic device 30.

The rotary plate 110 is formed as a rectangular flat plate, the L-shaped projections 120 are provided at left and right sides of the front surface of the rotary plate 110 (the surface thereof in a direction toward the seat back), and the mesh net 130 is coupled to the rear surface of the rotary plate 110 (the surface thereof in a rearward direction).

The auxiliary battery 20 is inserted between the two projections 120 so as to be received therein, and the portable electronic device 30 is inserted into the mesh net 130 so as to be received therein.

A receiving recess 150 dented in a concave shape is formed on the back board 14, and the auxiliary battery 20 fixed by the projections 120 is inserted into the receiving recess 150 so as to be received therein.

When the rotary plate 110 closes the receiving recess 15 of the back board 14, the auxiliary battery 20 is inserted into the receiving recess 15 so as to be received therein, and thereby, the external appearance of the receiving device 100 may be improved due to prevention of exposure of the auxiliary 20 to the outside.

When the rotary plate 110 closes the receiving recess 15 of the back board 14 and thus the auxiliary 20 is received in the receiving recess 15, the portable electronic device 30 received in the mesh net 130 is exposed rearwards so as to be within a line of sight of a passenger seated in a back seat (i.e., rear seat) of the vehicle, and as a result, the passenger in the back seat may easily look at the portable electronic device 30.

The rotary plate 110 may open and close the receiving recess 15 by rotating the upper end of the rotary plate 110 about hinge shafts 140 provided at the lower end of the rotary plate 110 and coupled to the back board 140.

An open spring 150 is installed on each of the hinge shafts 140, one end of the open spring 150 is supported by the back board 14, and the other end of the open spring 150 is supported by the rotary plate 110.

The open springs 150 are compressed, when the rotary plate 110 is rotated in a direction of closing the receiving recess 15, and rotates the rotary plate 110 using elastic force to open the receiving recess 15, when locking to close the receiving recess 15 is released.

The receiving recess 15 may be opened and closed by rotation of the rotary plate 110 and, in the state in which the rotary plate 110 closes the receiving recess 15, the auxiliary battery 20 restrained by the projections 120 is inserted into the receiving recess 15 so as to be received therein, and the portable electronic device 30 restrained by the mesh net 130 is exposed rearwards so as to be exposed to sight of the passenger in the back seat of the vehicle.

Further, power of the auxiliary battery 20 received in the receiving recess 15 is wirelessly transmitted to the portable electronic device 30 restrained by the mesh net 130, and wirelessly charges the portable electronic device 30.

The passenger may take the portable electronic device 30 out of the mesh net 130 to use the portable electronic device 30, and may take the auxiliary battery 20 from the projections 120 to use the auxiliary battery 20 after rotating the rotary plate 110 rearwards to open the receiving recess 15.

A connection terminal 160 electrically connected to the auxiliary battery 20 restrained by the projections 120 is provided on the rotary plate 110, and the connection terminal 160 is electrically connected to the vehicle power supply 50 and the convenience device 40 of the seat 10 through the controller 200.

The connection terminal 160 is provided at the lower end of the front surface of the rotary plate 110, and is electrically connected to a terminal provided at the lower end of the auxiliary battery 20.

The vehicle power supply 50 may be a main battery configured to supply power so as to drive the vehicle or electrical equipment of the vehicle.

The convenience device 40 of the seat 100 may include any one of all convenience devices operated using electricity, such as an electric seat rail device to move the seat 10 in forward and rearward directions, a seat heating device, a seat ventilation device, and a seat height adjustment device.

The vehicle power supply 50 is electrically connected to the controller 200 by wires, the controller 200 is electrically connected to the convenience device 40 of the seat 10 by wires, and the controller 200 is electrically connected to the connection terminal 160 provided on the rotary plate 110 by wires.

Therefore, when the connection terminal 160 of the rotary plate 110 is electrically connected to the terminal of the auxiliary battery 20, power of the vehicle power supply 50 is supplied to the auxiliary battery 20 through the controller 200, and charges the auxiliary battery 20.

Figure 10:
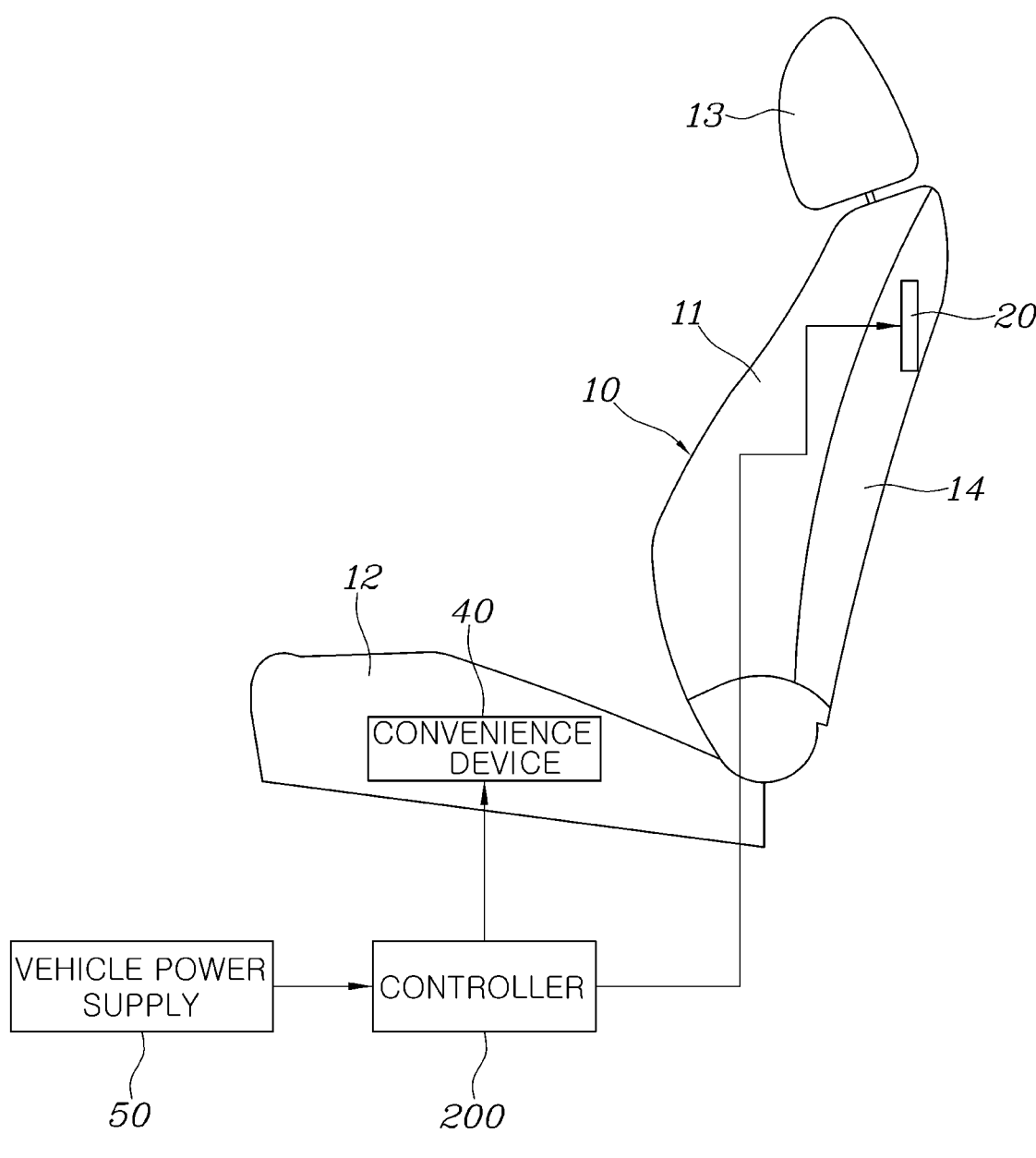
FIG. 10 is a view illustrating a normal state in which the auxiliary battery is charged with power of a vehicle power supply.

That is, in the normal state in which no accident occurs, as shown in FIG. 10, the controller 200 may transmit power, supplied from the vehicle power supply 50 to the convenience device 40 of the seat 10, to the auxiliary battery 20 received in the receiving device 100, and may thus charge the auxiliary battery 20.

A device configured to change voltage may be installed in the auxiliary battery 20 or the controller 200 so as to charge the auxiliary battery 20 using power of the vehicle power supply 50.

That is, such a voltage change device may change voltage of 13.5 V of the vehicle power supply 50 to voltage of 5 V for the auxiliary battery 20.

Charging of the auxiliary battery 20 may be automatically terminated by cutting off a circuit when the charge rate of the auxiliary battery 20 reaches a designated level, and the auxiliary battery 20 may be protected thereby.

As another example, when the amount of current supplied from the vehicle power supply 50 to the convenience device 40 of the seat 10 is equal to or greater than a predetermined amount, the controller 200 may transmit power, supplied to the convenience device 40 of the seat 10, to the auxiliary battery 20 received in the receiving device 100, and may thus charge the auxiliary battery 20.

Figure 11:
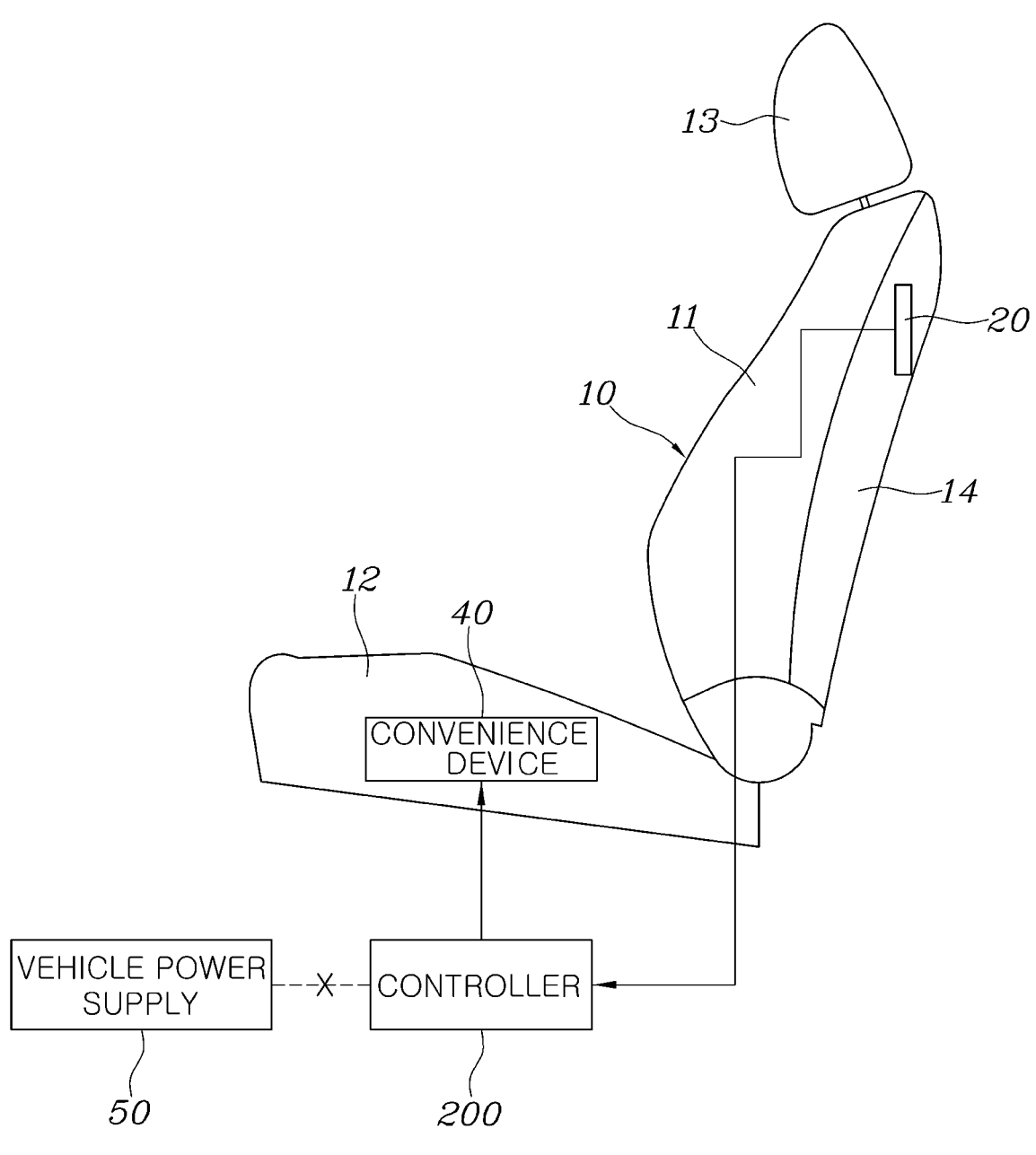
FIG. 11 is a view illustrating an emergency situation in which power of the auxiliary battery is supplied to a convenience device of the seat.

When power supply from the vehicle power supply 50 to the convenience device 40 of the seat 10 is cut off, as shown in FIG. 11, the controller 200 may discharge power of the auxiliary battery 20 so as to supply the power of the auxiliary battery 20 to the convenience device 40 of the seat 10.

When a wire connecting the vehicle power supply 50 to the controller 200 is broken due to a collision accident or power of the vehicle power supply 50 is not supplied to the convenience device 40 of the seat 10 due to failure of other hardware, power of the auxiliary battery 20 is discharged and supplied to the convenience device 40 of the seat 10 under control of the controller 200.

Therefore, the convenience device 40 of the seat 10 may receive power from the auxiliary battery 20, and may normally perform functions of the seat 10, and as a result, in the event of an accident, an evacuation space may be secured by moving the seat 10, and heating wires may be operated to preserve a passenger's body temperature in a freezing area so as to minimize loss of life.

As another example, when the amount of current supplied from the vehicle power supply 50 to the convenience device 40 of the seat 10 is less than the predetermined amount, the controller 200 may discharge power of the auxiliary battery 20 so as to supply the power of the auxiliary battery 20 to the convenience device 40 of the seat 10.

The receiving device 100 according to the present disclosure further includes a locking device 300 configured to maintain the closed state of the receiving recess 15 by the rotary plate 110, and the open springs 150 provided on the hinge shafts 140 of the rotary plate 110 serve to provide elastic force to the rotary plate 110 so as to rotate the rotary plate 110 in a direction of opening the receiving recess 15 when the locking device 300 is unlocked.

Figure 12:
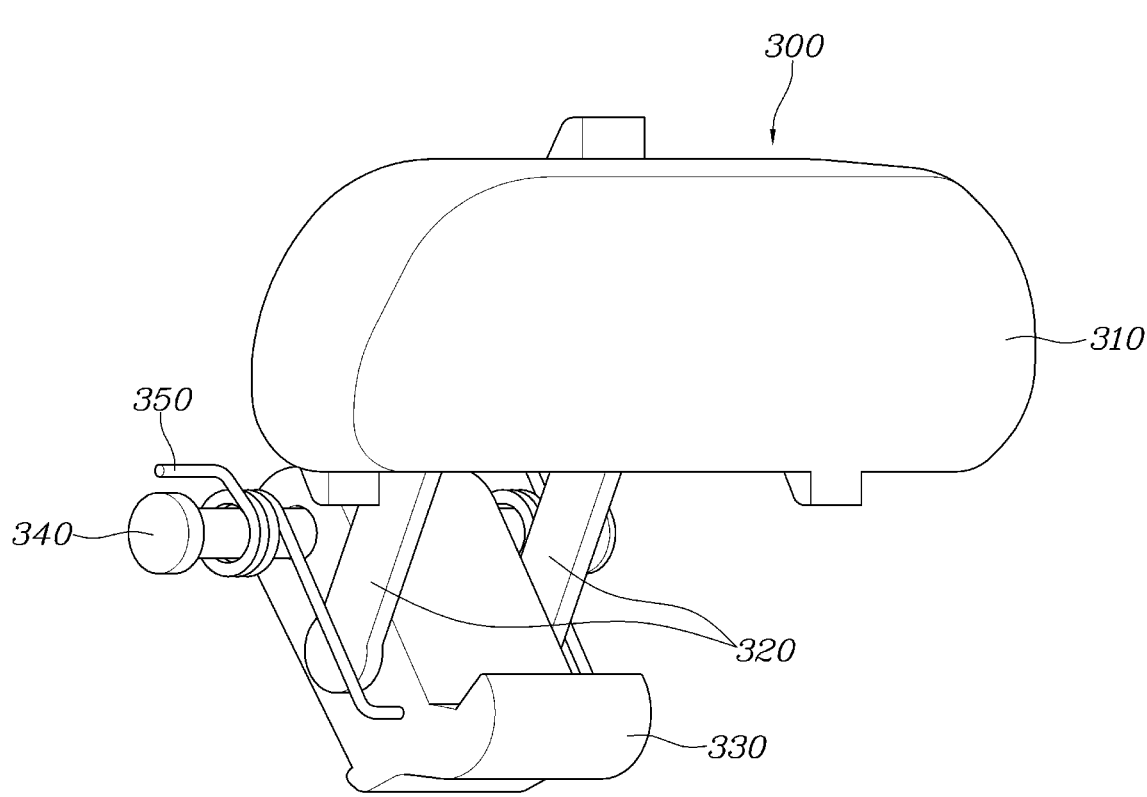
FIGS. 12 and 13 are views illustrating a locking device according to a first embodiment of the present disclosure.
Figure 13:
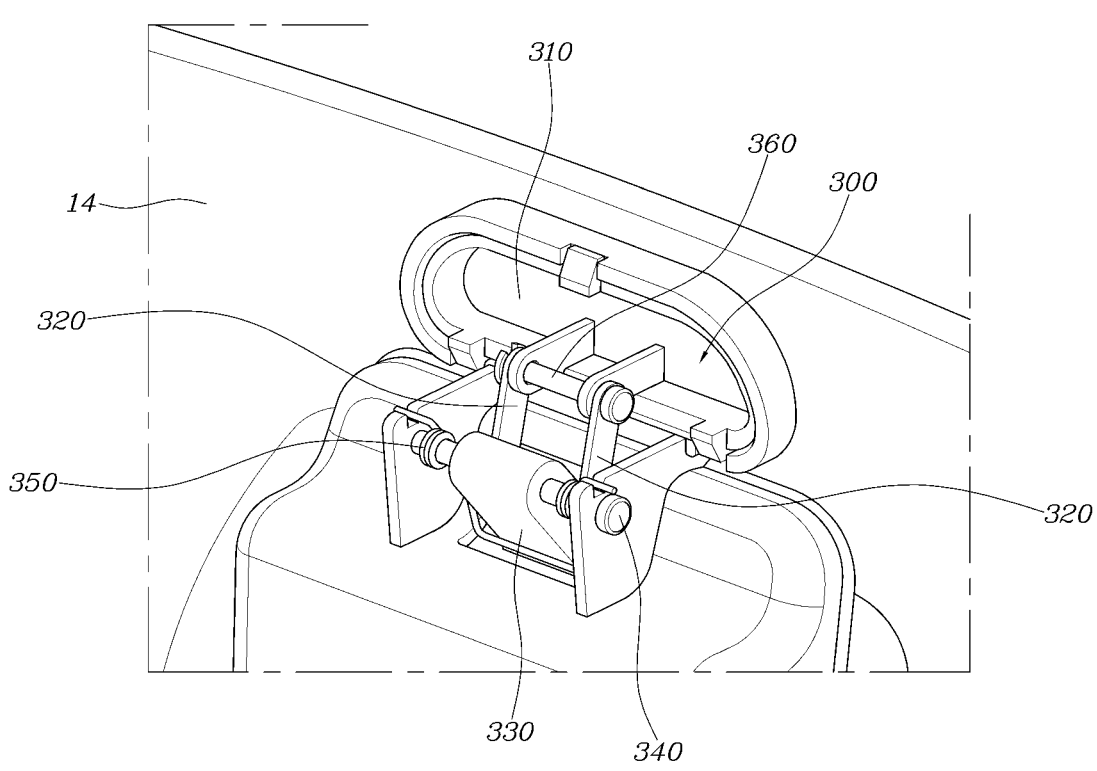

FIGS. 12 and 13 show a locking device 300 according to a first embodiment.

The locking device 300 according to the first embodiment includes a locking button 310 provided on the rotary plate 110 and operated by pressing, a locking hook 330 connected to the locking button 310 through links 320 and configured to maintain a locked state between the locking hook 330 and a locking protrusion 170 provided on the rotary plate 110 when the locking hook 330 comes into contact with the locking protrusion 170, and locking springs 350 installed on a lower end hinge pin 240 configured to connect the links 320 to the locking hook 330, and configured to have one end supported by the back board 14 and the other end supported by the locking hook 330 and to provide elastic force to the locking hook 330 so as to maintain the locked state between the locking hook 330 and the locking protrusion 170.

Here, reference numeral 360 indicates an upper end hinge pin 350 configured to connect the locking button 310 to the links 320.

The locking button 310 is installed to penetrate the rotary plate 110, the locking hook 310 is moved by operation of the links 320 and is separated from the locking protrusion 170 and thus the locked state between the locking hook 310 and the locking protrusion 170 is released, when a passenger operates the locking button 310 by pressing the locking button 310, and, in such an unlocked state, the receiving recess 15 of the back board 14 may be opened through rotation of the rotary plate 110.

When the rotary plate 110 is rotated toward the back board 14 to close the receiving recess 15, the locked state between the locking hook 310 and the locking protrusion 170 may be maintained by coupling therebetween, and the closed state of the receiving recess 15 by the rotary plate 110 may be maintained in the locked state.

Figure 14:
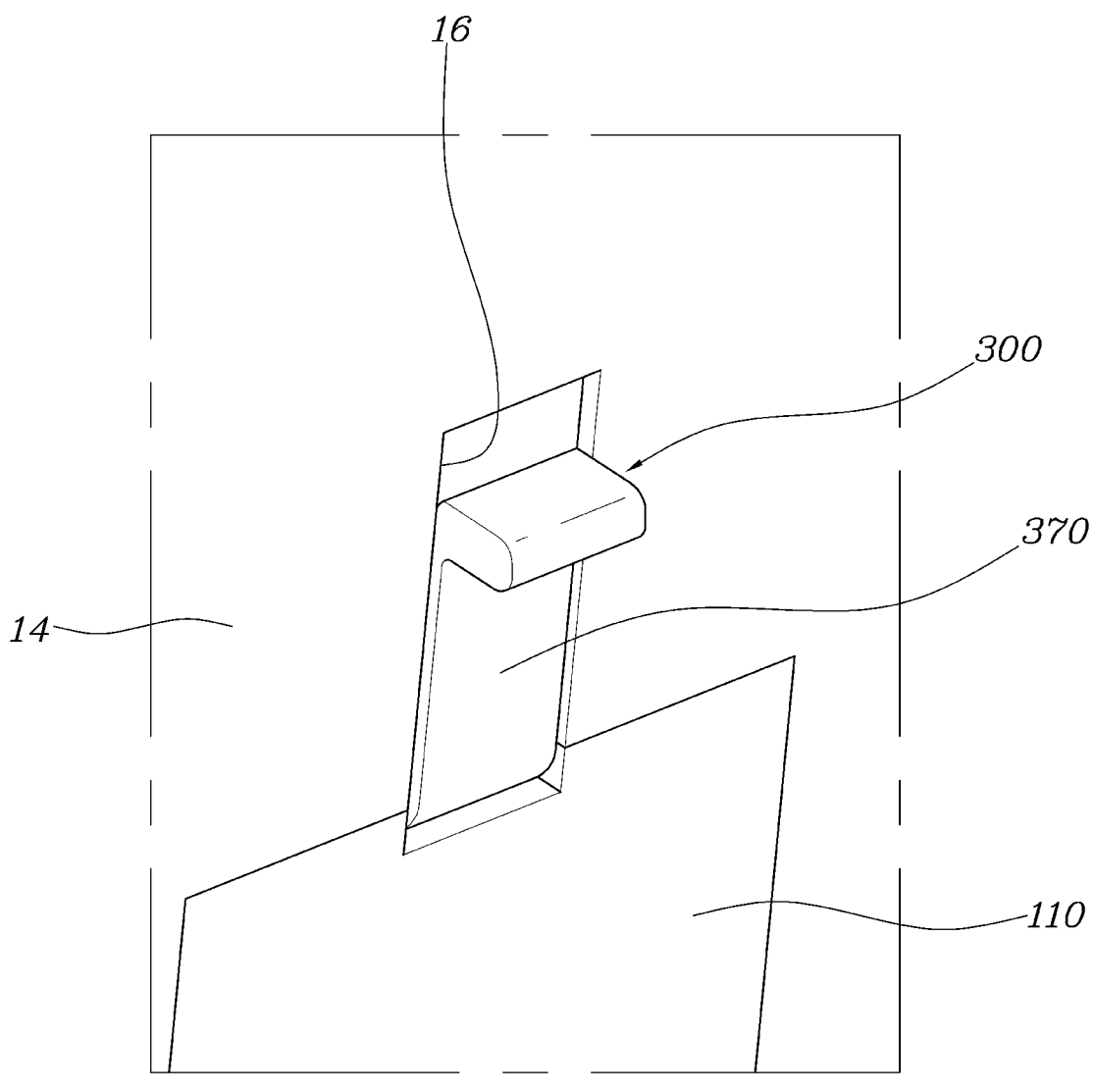
FIGS. 14 and 15 are views illustrating a locking device according to a second embodiment of the present disclosure.
Figure 15:
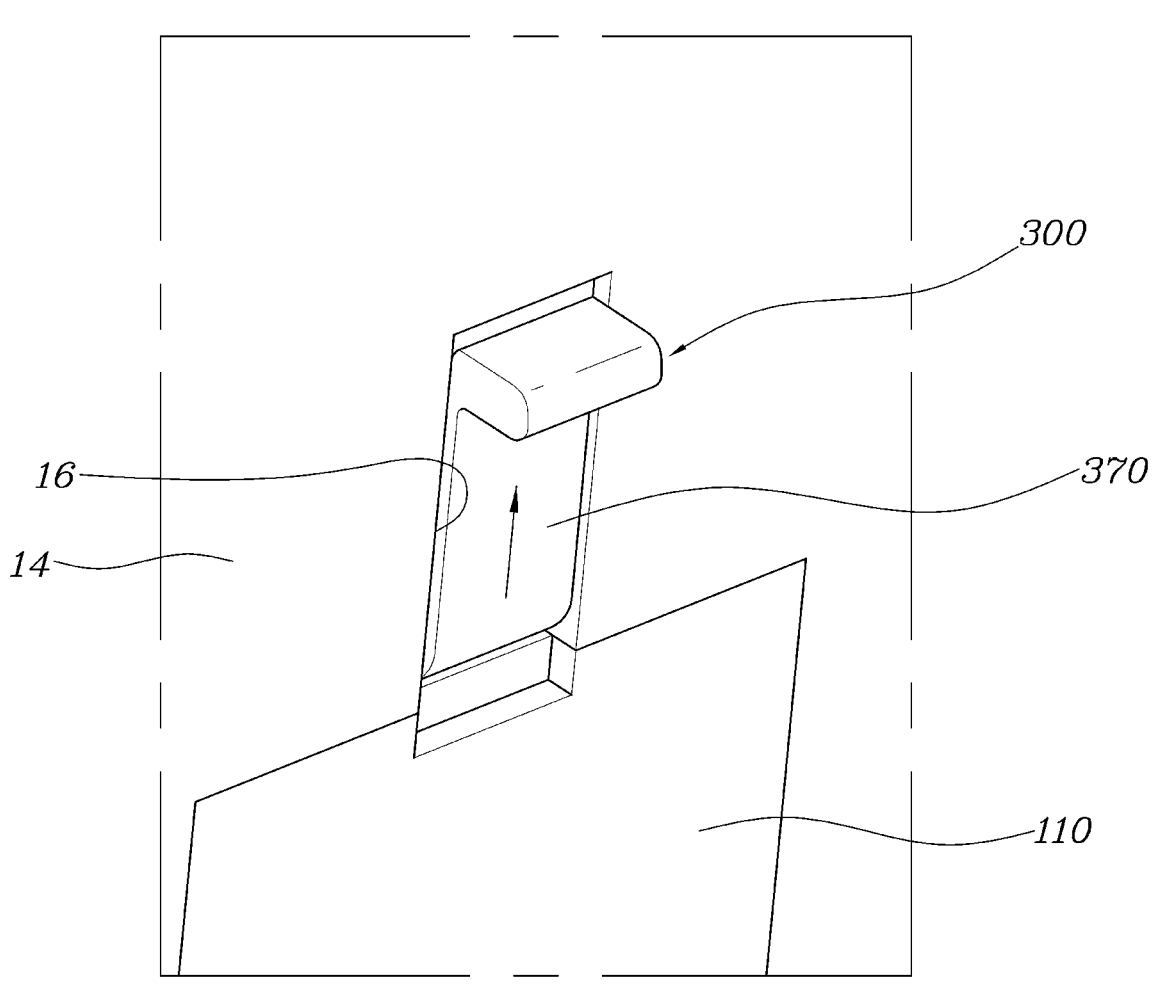

FIGS. 14 and 15 show a locking device 300 according to a second embodiment.

The locking device 300 according to the second embodiment includes a locking lever 370 provided on the back board 14 and operated by upward and downward sliding.

A guide recess 16 configured to guide movement of the locking lever 370 is formed to extend vertically on the back board 14.

When the locking lever 30 is lowered along the guide recess 16 and the lower end of the locking lever 370 overlaps the upper part of the rotary plate 110, as shown in FIG. 14, the locked state of the rotary plate 110 by the locking lever 370 is maintained in a state in which the rotary plate 110 closes the receiving recess 15 of the back board 140.

When the locking lever 30 is raised along the guide recess 16 and the lower end of the locking lever 370 is separated from the upper part of the rotary plate 110, as shown in FIG. 15, the locked state of the rotary plate 110 by the locking lever 370 is released, and thus, the rotary plate 100 may be rotated with respect to the back board 14 to open the receiving recess 15.

In one embodiment of the present disclosure, when the vehicle is charged using an external charging device in the state in which the auxiliary battery 20 is received in the receiving device 110, the auxiliary battery 20 may be charged together with the vehicle, and if necessary, power of the charged auxiliary battery 20 may be discharged by the controller 200, and may be supplied to the vehicle power supply 50 or other power supplies of the vehicle so as to be used as a vehicle power source, thereby being capable of contributing to improvement of energy efficiency.

The controller 200 according to the present disclosure may be configured to be provided separately from the auxiliary battery 20 so as to control the input and output modes of the auxiliary battery 20, or the auxiliary battery 20 may be configured to recognize the input and output modes so as to control input and output.

When the auxiliary battery 20 is configured to recognize the input and output modes so as to control input and output, the auxiliary battery 20 may be controlled to start power discharge to the outside when constant power charging is stopped through the inner circuit of the auxiliary battery 20.

As described above, the vehicle seat apparatus according to the present disclosure is configured such that the receiving device 100 is provided on the back board 14 of the seat 10 of the vehicle, and the auxiliary battery 20 and the portable electronic device 30 are received in the receiving device 100 or taken from the receiving device 100, may charge the auxiliary battery 20 with power of the vehicle power supply 50 or may wirelessly charge the portable electronic device 30 with power of the auxiliary battery 20 in normal times when no accident occurs, thereby being capable of expanding the range of passengers using wireless charging in vehicles and thus improving convenience.

Further, the vehicle seat apparatus according to the present disclosure is configured such that power of the charged auxiliary battery 20 is discharged and supplied to the convenience device 40 of the seat 10 so as to normally perform the functions of the seat 10, in a situation in which power of the vehicle power supply 50 is not supplied to the convenience device 40 of the seat 10, thereby being capable of reducing loss of life in the event of an accident.

As is apparent from the above description, a vehicle seat apparatus according to the present disclosure is configured such that a receiving device is provided on a back board of a seat of a vehicle, and an auxiliary battery and a portable electronic device are received in the receiving device or taken from the receiving device, may charge the auxiliary battery with power of a vehicle power supply or may wirelessly charge the portable electronic device with power of the auxiliary battery in normal times when no accident occurs, thereby being capable of expanding the range of passengers using wireless charging in vehicles and thus improving convenience.

Further, the vehicle seat apparatus according to the present disclosure is configured such that power of the charged auxiliary battery is discharged and supplied to the convenience device of the seat so as to normally perform the functions of the seat, in a situation in which power of the vehicle power supply is not supplied to the convenience device of the seat, thereby being capable of reducing loss of life in the event of an accident.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A vehicle seat apparatus comprising:
   a receiving device provided on a seat of a vehicle, wherein an auxiliary battery and a portable electronic device are configured to be received in the receiving device; and
   a controller configured to control power transmission between the auxiliary battery received in the receiving device and a convenience device of the seat,
   wherein the receiving device comprises:
   a rotary plate rotatably coupled to a back board of the seat;
   projections provided on one surface of the rotary plate to fix the received auxiliary battery; and
   a mesh net provided on a remaining surface of the rotary plate to restrain the received portable electronic device.

2. The vehicle seat apparatus according to claim 1, wherein the portable electronic device received in the receiving device is wirelessly charged by the auxiliary battery.

3. The vehicle seat apparatus according to claim 1, wherein:
   a receiving recess is formed on the back board; and
   the auxiliary battery fixed by the projections is inserted into the receiving recess so as to be received therein.

4. The vehicle seat apparatus according to claim 3, wherein the receiving recess is dented in a concave shape.

5. The vehicle seat apparatus according to claim 1, wherein:

a receiving recess configured such that the auxiliary battery is inserted thereinto so as to be received therein is formed on the back board; and the rotary plate opens and closes the receiving recess by rotating an upper end of the rotary plate about hinge shafts provided at a lower end of the rotary plate and coupled to the back board.

6. The vehicle seat apparatus according to claim 5, wherein the receiving device further comprises:

a locking device configured to maintain a closed state of the receiving recess by the rotary plate; and open springs installed on the hinge shafts of the rotary plate, and configured to have one end supported by the back board and a remaining end supported by the rotary plate and to provide elastic force to the rotary plate so as to rotate the rotary plate in a direction of opening the receiving recess when the locking device is unlocked.

7. The vehicle seat apparatus according to claim 6, wherein the locking device comprises:

a locking button provided on the rotary plate and operated by pressing;

a locking hook connected to the locking button through links and configured to maintain a locked state between the locking hook and a locking protrusion provided on the rotary plate, when the locking hook comes into contact with the locking protrusion; and locking springs installed on a lower end hinge pin configured to connect the links to the locking hook, and configured to have one end supported by the back board and a remaining end supported by the locking hook and to provide elastic force to the locking hook so as to maintain the locked state between the locking hook and the locking protrusion.

8. The vehicle seat apparatus according to claim 6, wherein the locking device comprises a locking lever provided on the back board and operated by upward and downward sliding, wherein, when an end of the locking lever overlaps the rotary plate, a locked state of the rotary plate by the locking lever is maintained in a state in which the rotary plate closes the receiving recess.

9. The vehicle seat apparatus according to claim 1, wherein the portable electronic device received in the mesh net is exposed rearwards so as to be within a line of sight of a passenger seated in a back seat of the vehicle.

10. The vehicle seat apparatus according to claim 1, wherein:

a connection terminal electrically connected to the auxiliary battery restrained by the projections is provided on the rotary plate; and the connection terminal is electrically connected to a vehicle power supply and the convenience device of the seat through the controller.

11. The vehicle seat apparatus according to claim 10, wherein the controller transmits power, supplied from the vehicle power supply to the convenience device of the seat, to the auxiliary battery received in the receiving device so as to charge the auxiliary battery.

12. The vehicle seat apparatus according to claim 10, wherein the controller discharges power of the auxiliary battery so as to supply the power of the auxiliary battery to the convenience device of the seat, when power supply from the vehicle power supply to the convenience device of the seat is cut off.

13. The vehicle seat apparatus according to claim 10, wherein the controller transmits power, supplied to the convenience device of the seat, to the auxiliary battery received in the receiving device so as to charge the auxiliary battery, when an amount of current supplied from the vehicle power supply to the convenience device of the seat is equal to or greater than a predetermined amount.

14. The vehicle seat apparatus according to claim 10, wherein the controller discharges power of the auxiliary battery so as to supply the power of the auxiliary battery to the convenience device of the seat, when an amount of current supplied from the vehicle power supply to the convenience device of the seat is less than a predetermined amount.

15. The vehicle seat apparatus according to claim 1, wherein:

when the vehicle is charged in a state in which the auxiliary battery is received in the receiving device, the auxiliary battery is configured to be charged together with the vehicle.

16. The vehicle seat apparatus according to claim 15, wherein when the auxiliary battery is charged, power of the charged auxiliary battery is usable as a vehicle power source.

17. The vehicle seat apparatus according to claim 1, wherein the controller is configured to be provided separately from the auxiliary battery so as to control input and output modes of the auxiliary battery, or the auxiliary battery is configured to recognize input and output modes so as to control input and output.

18. A vehicle seat comprising the vehicle seat apparatus of claim 1.

19. A vehicle comprising the vehicle seat apparatus of claim 1.

\* \* \* \* \*